(12) United States Patent
Janicek

(10) Patent No.: US 6,366,450 B1
(45) Date of Patent: Apr. 2, 2002

(54) HIDEAWAY INTEGRATED DOCKING CRADLE

(75) Inventor: Michael Janicek, Sioux City, IA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/458,557

(22) Filed: Dec. 9, 1999

(51) Int. Cl.$^7$ ................................................ G06F 1/16
(52) U.S. Cl. ................... 361/680; 361/681; 345/905; 439/139
(58) Field of Search ............................... 361/680, 679, 361/681, 683; 345/168, 169, 905; 400/489, 682, 691–693; 312/208.1, 208.4; 341/22; 364/708.1; 439/142, 143

(56) References Cited

U.S. PATENT DOCUMENTS

| | | | |
|---|---|---|---|
| 5,058,045 A | 10/1991 | Ma | 364/708 |
| 5,126,954 A | 6/1992 | Morita | 364/708 |
| 5,187,645 A | 2/1993 | Spalding et al. | 361/393 |
| D336,287 S | 6/1993 | Mitzusgui et al. | D14/107 |
| 5,347,425 A | 9/1994 | Herron et al. | 361/683 |
| 5,373,149 A * | 12/1994 | Rasmussen | 235/492 |
| D356,782 S | 3/1995 | Leman | D14/100 |
| 5,537,343 A | 7/1996 | Kikinis et al. | 364/708.1 |
| 5,552,957 A | 9/1996 | Brown et al. | 361/683 |
| 5,555,448 A * | 9/1996 | Thiede et al. | 455/89 |
| D375,945 S | 11/1996 | Shin et al. | D14/107 |
| D380,204 S | 6/1997 | Bares | D14/107 |
| D389,146 S | 1/1998 | Tan | D14/106 |
| D389,819 S | 1/1998 | Yamazaki | D14/107 |
| D391,929 S | 3/1998 | Inoue | D14/107 |
| D402,642 S | 12/1998 | Faranda et al. | D14/107 |
| 5,872,557 A | 2/1999 | Wiemer et al. | 345/156 |
| 5,910,800 A * | 6/1999 | Shields et al. | 345/336 |
| 6,072,695 A * | 6/2000 | Steiger et al. | 361/686 |
| 6,113,050 A * | 9/2000 | Rush | 248/918 |
| 6,154,010 A * | 11/2000 | Geiger | 320/137 |

OTHER PUBLICATIONS

"Motorola Satellite Series Accessories", http//www.mot.com/GSS/SSTG/mwins/iridaccessories.html, 1–6, (Mar. 10, 1999).

"Personal Digital Assistance", http//www.cbn.net.id/commerce/bmg/english/pda/htm, 1–6, (Mar. 10, 1999).

"Timely News", http//www.panasonic.com/PCEC/palm-cam/timely.html, Matsushita Corporation of America, Digital Imaging Product News, 1, (Mar. 10, 1999).

"World Cyberlinks", http/www.worldcyberlinks.com./, World Cyberlinks Corp., 1–3, (Mar. 10, 1999).

"World Cyberlinks Announces Introduction of Multiple Unit Docking Cradle for SOHO Market", http//infoseek.go.com/Content?arn=PR1542. . . sv=IS&1k=noframes&col=NX&kt=A&ak=news1486, 1–2, (Mar. 10, 1999).

* cited by examiner

Primary Examiner—Leo P. Picard
Assistant Examiner—Hung Van Duong
(74) Attorney, Agent, or Firm—Kenneth J. Cool; Rodney L. Lacy; Schwegman, Lundberg, Woessner & Kluth

(57) ABSTRACT

A hideaway integrated docking cradle which may be positioned on a computer or other peripheral device, such as a keyboard, monitor, or printer, includes a docking cradle rotatably attached to a host device, the cradle movable from a first position in which it is closed and substantially flush with the external contour of the host device, and a second, operational position in which the docking cradle rests against the housing so as to allow the connection and retention of a PDA within the cradle. The hideaway integrated docking cradle may be integrated into furniture or other non-computer devices which are linked to a computer in some fashion.

29 Claims, 7 Drawing Sheets

HIDEAWAY INTEGRATED DOCKING CRADLE

FIELD

The present invention relates generally to an interconnection mechanism for electronic device, and more particularly to a concealed docking cradle for a PDA.

BACKGROUND

Personal digital assistants (PDAs) are typically small, hand-held electronic devices capable of storing and retrieving data and information that a user might wish to enter or access while away from the user's personal computer. PDAs have become more and more common as their size decreases to where a typical PDA may easily be kept in a purse, handbag, briefcase, or the like.

PDAs typically contain a microprocessor, a main memory, some limited amount of storage such as read only memory, a display screen, and an input device. Typically, the input device is a touch pad or pen, but other input devices are known. PDAs most often have loaded into their main memory an operating system with limited functionality, such as Microsoft Windows CE, and one or more software programs or modules for assistance in the performance of some routine daily tasks. Such modules may include a calendar, an address book, a scheduler, a memo pad, a to-do list, and the like. They may also include simple games and electronic mail (E-mail) reading and writing capability.

PDAs also contain software or firmware allowing the PDA to be linked with a computer, such as a portable or laptop computer, a desktop computer, or the like, in order to transfer information between the PDA and the computer. Such information transfer may include the download and upload of E-mail, appointments, memos, and other such items.

To link with the computer, most PDAs use a docking cradle to facilitate recharging of the PDA battery and data transfer between the PDA and a computer. A traditional docking cradle is a stand-alone peripheral which includes a connector to connect to the PDA to transfer information, and a stand or cradle which allows the PDA to be placed in position to perform the transfer of information. In many PDAs, the docking cradle is connectable to a serial port of a computer through a serial cable which connects the connection port on the docking cradle.

Other PDA docking cradles are integrated with a computer such that the docking cradle is permanently affixed wo or integrally disposed upon the computer case. Such docking cradles take up a fairly large amount of area on computer, and are not aesthetically pleasing.

What is needed is a docking cradle that is integrated with a host device yet takes up less room at least when not in operation, and furthermore is more aesthetic.

SUMMARY

The present invention overcomes the problems of the prior art by providing a hideaway docking cradle for a PDA. The hideaway docking cradle of the present invention may be positioned on a computer or other peripheral device, such as a keyboard, monitor, printer, docking station for a laptop computer, or the like.

In one embodiment, a hideaway integrated docking cradle comprises a docking cradle rotatably attached to a host device, the cradle movable from a first position in which it is closed and substantially flush with the external contour of the host device, and a second, operational position in which the docking cradle rests against the housing so as to allow the connection and retention of a PDA within the cradle. Such a connection is accomplished not only by the connector port for the PDA, but also by gravity. A connector to connect a PDA to the docking cradle has a flat ribbon cable connection to the host device.

An opening in the housing of the host device may be shaped in another embodiment to conform to the path of travel of the docking cradle. In an alternative embodiment, the housing opening may be larger than the path of travel of the docking cradle.

In other embodiments, the hideaway integrated docking cradle of the present invention may be integrated into furniture or other non-computer devices which are linked to a computer in some fashion.

DESCRIPTION OF EMBODIMENTS

In the following description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
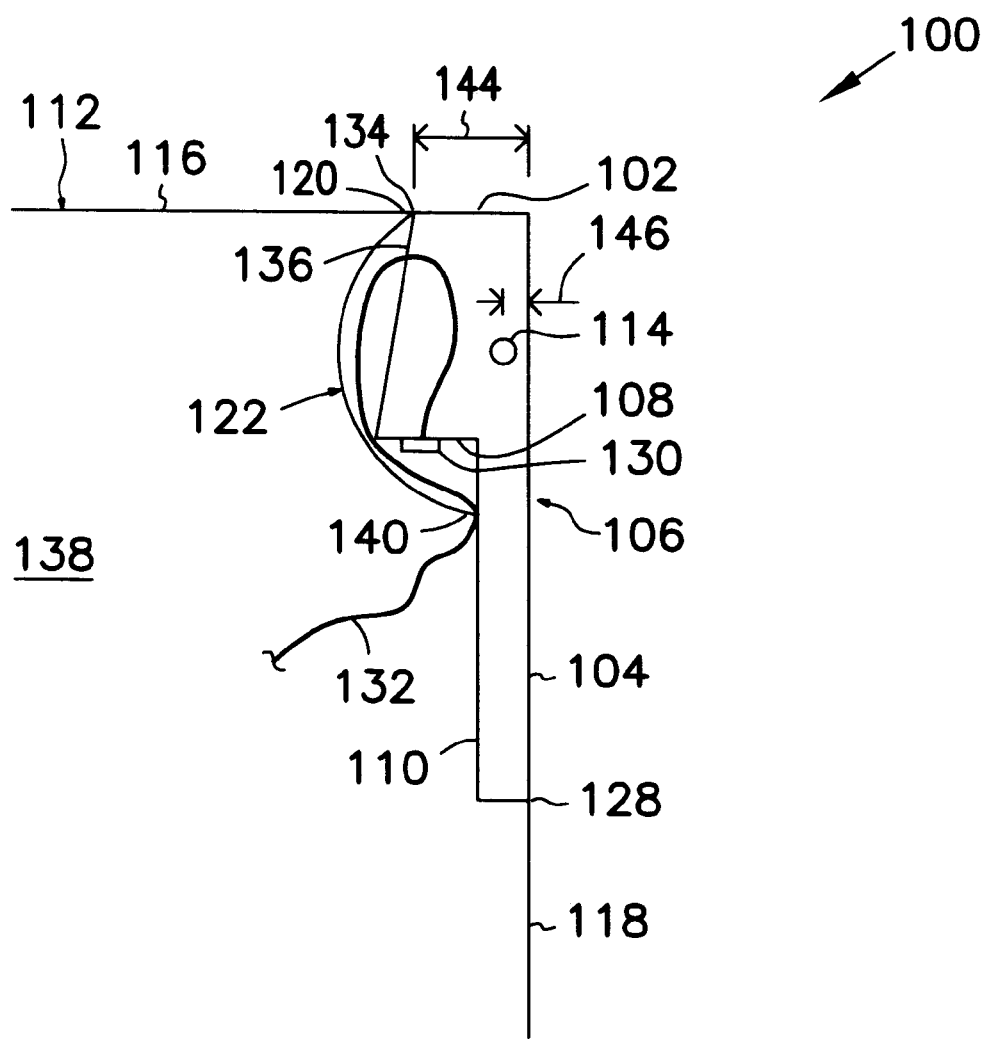
FIG. 1 is a cutaway side view of an embodiment of the present invention.

Referring now to FIG. 1, an embodiment 100 of a hideaway integrated docking cradle is seen from a side cutaway view. Docking cradle 100 comprises a first face 102 and a second face 104, a PDA support 106 having a cradle base 108 and a cradle back 110. The docking cradle 100 is rotatably mounted to a host device 112 by a connection along an axis 114. Axis 114 may comprise an opening or other means for rotatable attachment of the docking cradle 100 to a host device 112. The connection may be an axle or pin, or simple connections at each end of the docking cradle. Other means for rotatably connecting the docking cradle 100 to host device 112 may include, but not be limited to, a hinge, axle, pin, rod, or the like. Such connections are known to those skilled in the art, and are within the scope of the invention.

Figure 2:
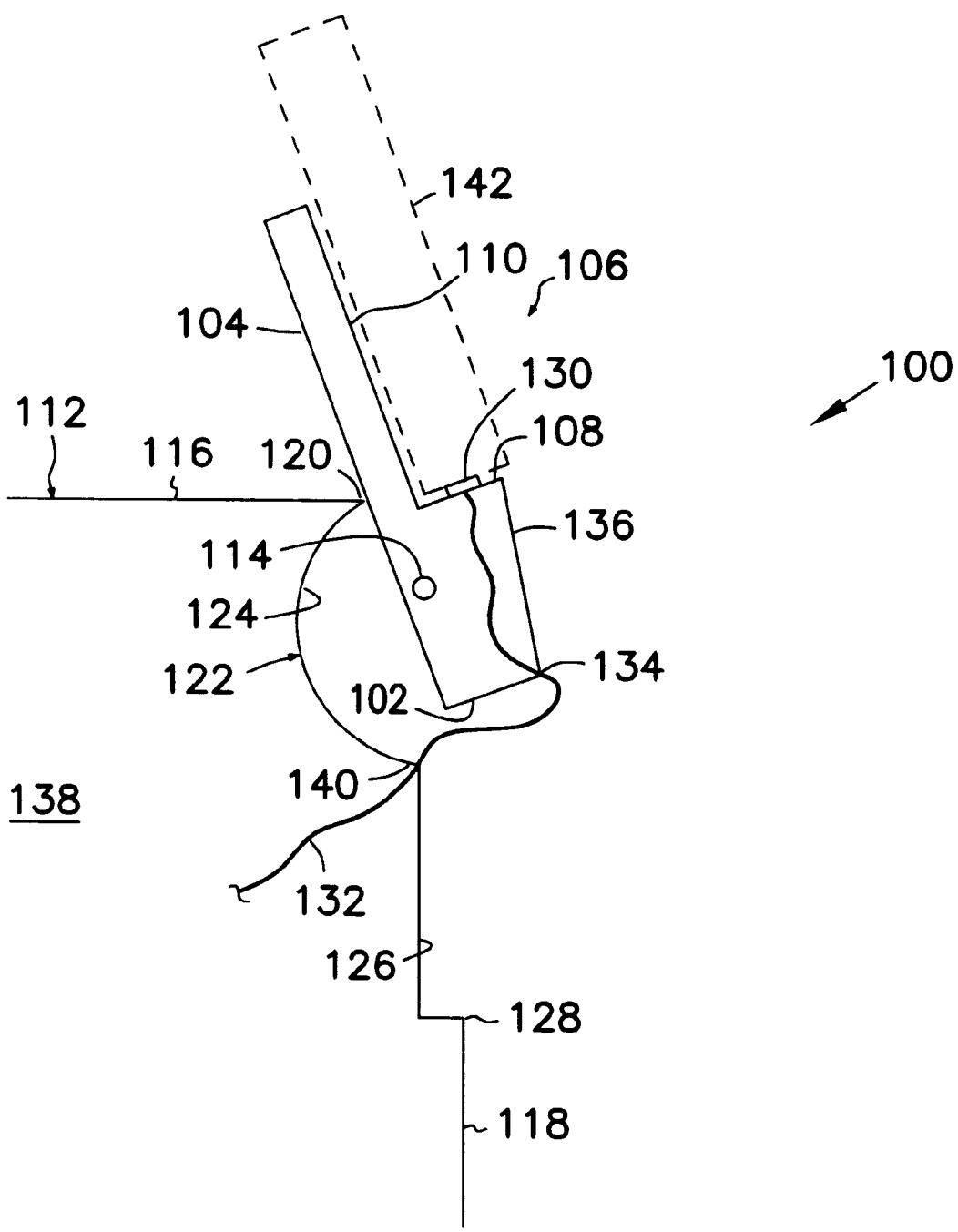
FIG. 2 is a cutaway side view of the embodiment of FIG. 1 in an operational position.

The hideaway integrated docking cradle 100 is rotatably moveable from a first, closed or stored, position as shown in FIG. 1, to a second, open or operational, position as shown in FIG. 2. In the first, closed, position, the docking cradle 100 first face 102 and second face 104 are substantially flush with the faces 116 and 118 of the host device 112. As shown in FIG. 1, first face 102 of docking cradle 100 is substantially flush with face 116 of host device 112, and second face 104 of docking cradle 100 is substantially flush with face 118 of host device 112 when the docking cradle 100 is in the first position. In this position, the docking cradle is hidden from sight, and is aesthetically integrated with the host device. Further, the hideaway integrated docking cradle 100 occupies less space than a traditional docking cradle. Docking cradle 100 is readily and easily accessible for use by rotating docking cradle 100 from its first, stored, position to its second, operational position.

In alternative embodiments, the faces 102 and 104 are shaped and sized to conform to the outer contour of the host device 112. For example, if the host device at the location of the integrated docking cradle has a curved outer contour, the external portion of the docking cradle 100 could be conformed to the outer contours of the host device 112. The external portion of the docking cradle 100, that is the area and faces of the docking cradle 100 which are in view when the docking cradle is in its first position, can easily be made to conform to nearly any external contour of a host device without departing from the scope of the invention.

As shown in FIG. 2, docking cradle 100 has been rotated about axis 114 into its second, operational position wherein the second face 104 contacts face 116 of host device 112, specifically at point 120. In this position, the docking cradle 100 forms a stand for placement of a PDA into the cradle.

The host device 112, in one embodiment, has a specifically designed housing opening 122 for retaining a hideaway integrated docking cradle such as docking cradle 100. As may be seen from FIGS. 1 and 2, housing opening 122 in one embodiment comprises a main opening 124 and a rectangular support opening 126. Main opening 124 is designed and shaped in one embodiment as arcuate such that when a docking cradle such as docking cradle 100 is held therein, rotation of the docking cradle from a closed to an operational position, or from an operational position to a closed position, will be able to be accomplished without the docking cradle being impeded in its motion.

Gravity retention of a PDA in PDA support 106 depends on the cradle back 110 being positioned such that a PDA such as PDA 142 will rest against the cradle back 110 at an angle sufficient to maintain a gravitational pull on the PDA against the cradle back 110 and to a lesser extent the cradle base 108. Such an angle alpha to the face 116 of the host device 112 is preferably less than 90 degrees. Angles alpha greater than 90 degrees in some circumstances will still allow retention of a PDA such as PDA 142 in PDA support 106, but such angles are less likely to maintain a good support for a PDA.

In order for the rotation of the docking cradle 100 from its first position to its second position to be accomplished while allowing the cradle to maintain an operational position allowing gravity retention of a PDA within the PDA support 106, the axis 114 is positioned near the outer face 118 of the host device 112. Face 102 of docking cradle 100 is shown to have a length 144. In order for the cradle back 110 to remain at an angle alpha less than 90 degrees, the axis 114 is positioned at a distance 146 from the face 104 of the docking cradle which is less than half of the length 144. This will allow the face 108 to rest against point 120 of face 116 so that the cradle back 110 remains at an angle alpha less than 90 degrees.

In other alternative embodiments, the cradle back 110 could be angled with respect to the face 104, so that the angle alpha is reduced further. This could allow the position of axis 114 with respect to face 104 to change. In still further embodiments, the entire PDA support 106, comprising cradle base 108 and cradle back 110, could be shifted with respect to faces 102 and 104, also to reduce the angle alpha.

In the embodiment of housing opening 122 shown in FIGS. 1 and 2, opening 124 is sized to closely conform to the minimum clearance required for all parts of docking cradle 100 to clear the host device 112 when the docking cradle is rotated about axis 114 between its closed and operational positions. Further, opening 126 is shown also to conform closely to the shape and size of PDA support 110. It should be understood that the housing opening 122 could, in other embodiments, be shaped differently without departing from the scope of the invention. For example, any housing opening sufficient in size to accommodate the docking cradle 100 and its necessary path of travel between its operational and closed positions would suffice. Further, cross sectional shape of the docking cradle 100 could differ in other embodiments, and in those embodiments, the shape of a housing opening such as opening 122 could also be changed to conform to the shape of the other cradle embodiments.

Figure 3:
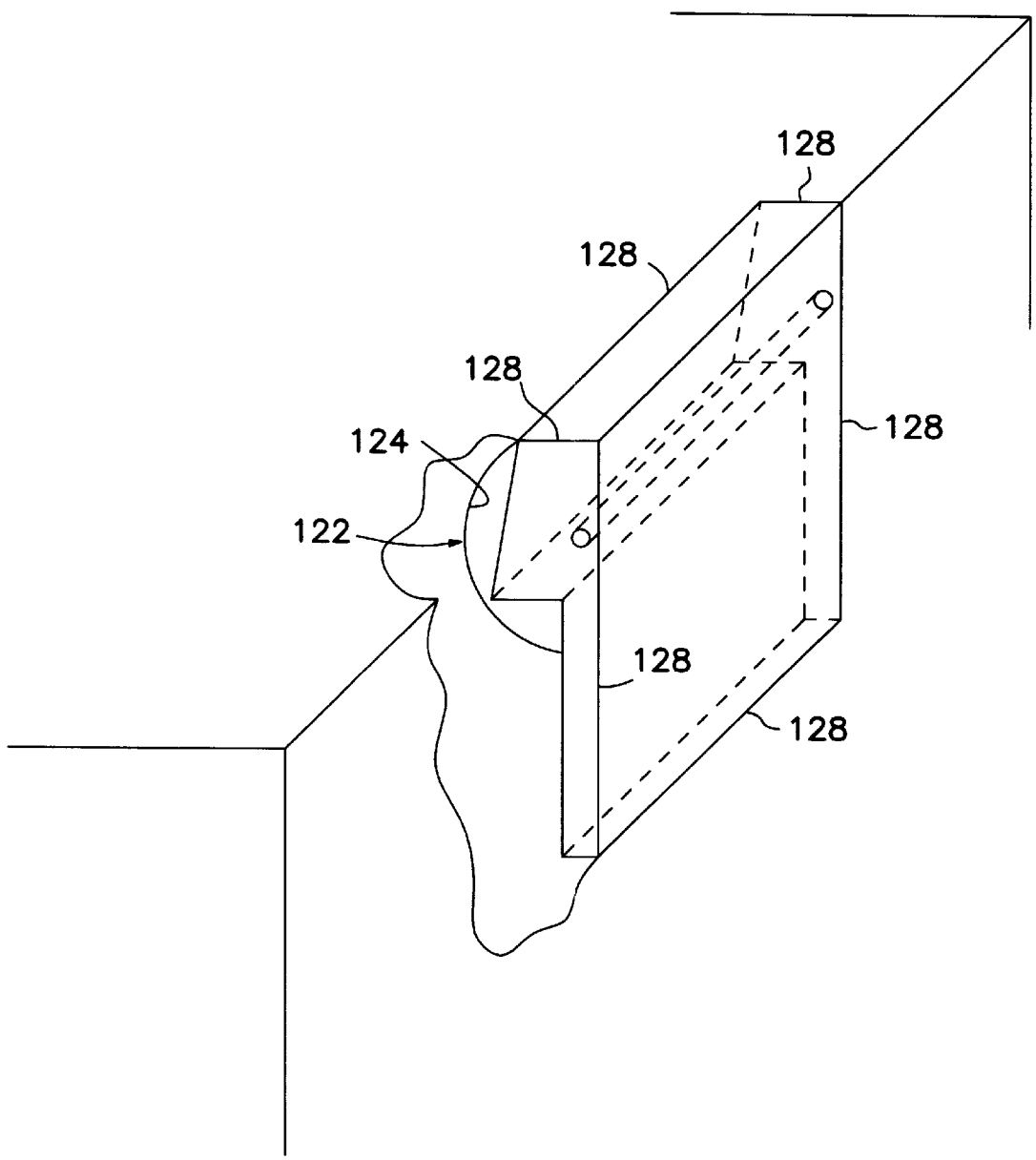
FIG. 3 is a perspective view of a representative computer system, partially cut away to show an embodiment of a docking cradle.
Figure 4:
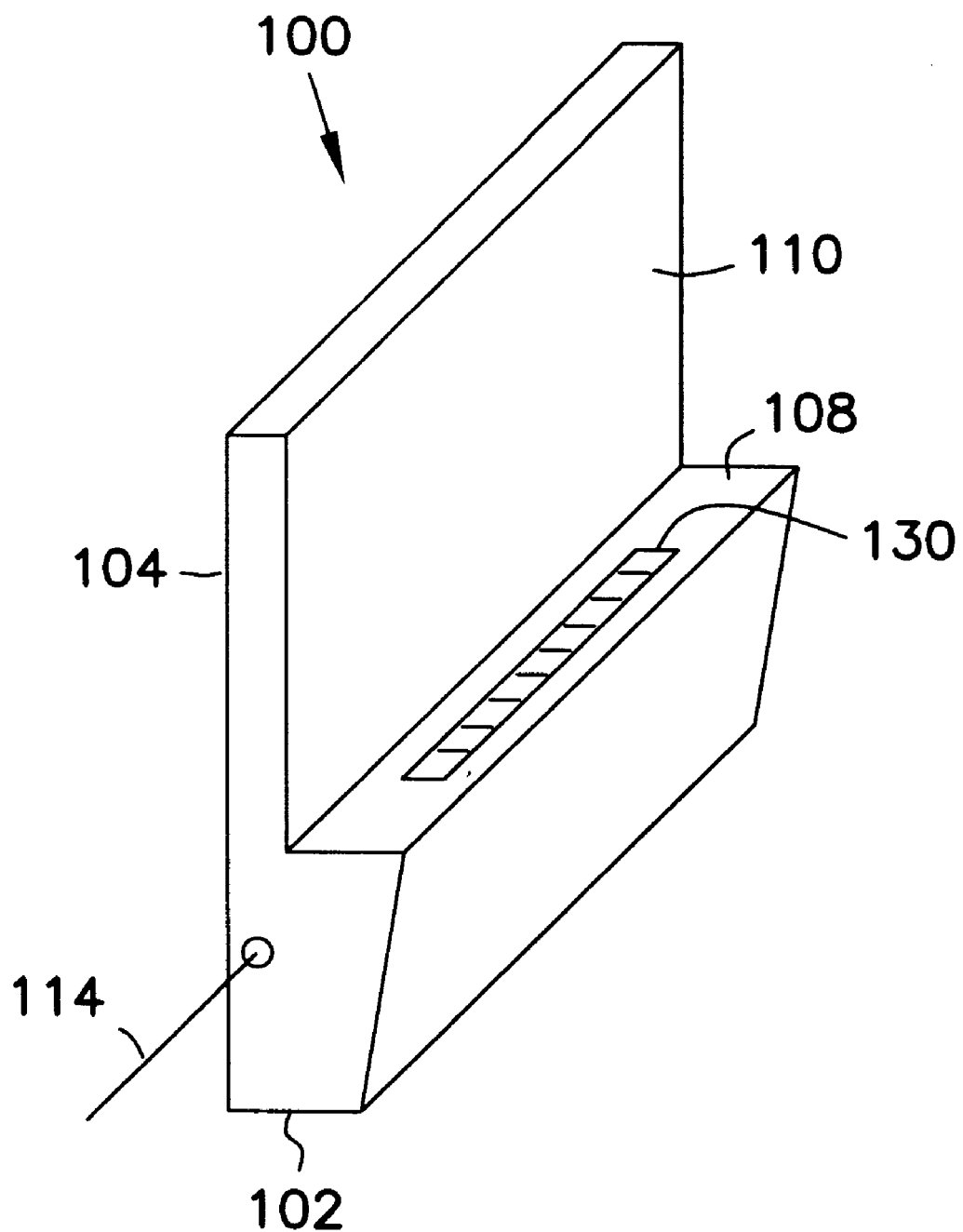
FIG. 4 is a perspective view of a docking cradle embodiment of the present invention.

In order to maintain the hidden, substantially flush configuration of the docking cradle 100 to the host device 112, the opening 122 should be limited in its visible scope to the extent of the external dimensions of the docking cradle 100. As such, shown best in FIG. 3, along the edge 128, the docking cradle 100 and the host device 112 should be closely adjacent each other so as to allow the integration of the docking cradle into the host device as aesthetic as possible.

The docking cradle 100 support 106 also contains a PDA connection port 130 on cradle base 108. This connection port 130 allows the communicative connection of a PDA to the cradle 100. In this embodiment, a flat ribbon cable (FRC) 132 is operatively connected to the connection port 130 and to the host device 112. It will be appreciated by those skilled in the art that many equivalents to FRC 132 are available for operatively connecting the connection port 130 and the host device 112, including variously bundled electrical conductors and optical fibers. The FRC 132 extends from the PDA connection port 130 through an opening 134 in face 136 of docking cradle 100 in one embodiment, and enters the internal portion 138 of the host device 112 through an opening 140 in the wall of the housing opening 122. When the docking cradle 100 is moved from its first position to its second position, the FRC 132 has enough slack in it to allow the motion of the docking cradle without constricting the FRC 132. Additionally, signals may be passed to the FRC 132 through an opening along axis 114.

Figure 5A:
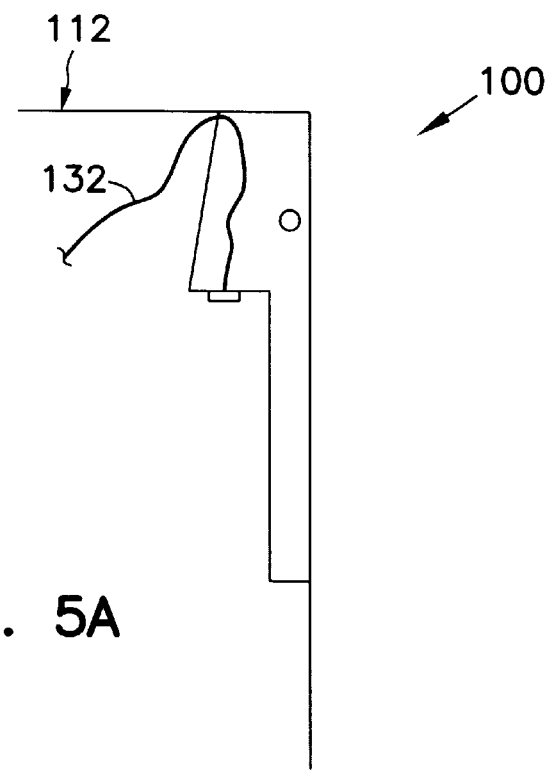
FIG. 5A is a view of an alternative embodiment of the invention in a closed position.
Figure 5B:
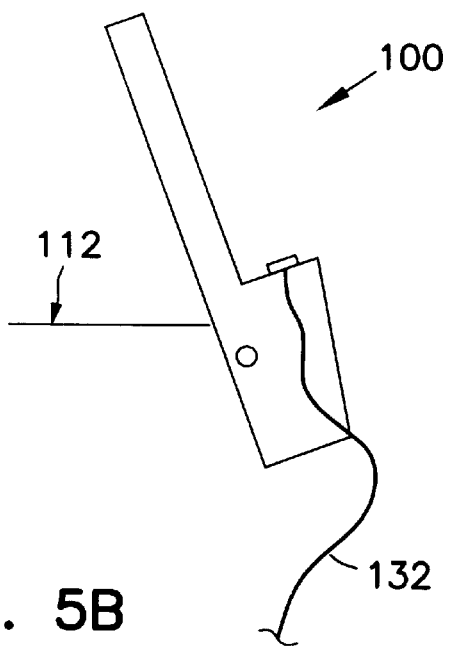
FIG. 5B is a view of an alternative embodiment of the invention is an operation position.

In an alternative embodiment, where internal space of the host device may not be limited by design, overall size, or other internal components, the host device may have a free and open area in which a docking cradle such as docking cradle 100 is positioned. In such an embodiment, shown in FIGS. 5A and 5B, the FRC 132 extends through opening 134 in face 136 of docking cradle 100 as described above. When the docking cradle is moved from its first position to its second position, the FRC is free to move with the docking cradle.

Figure 5C:
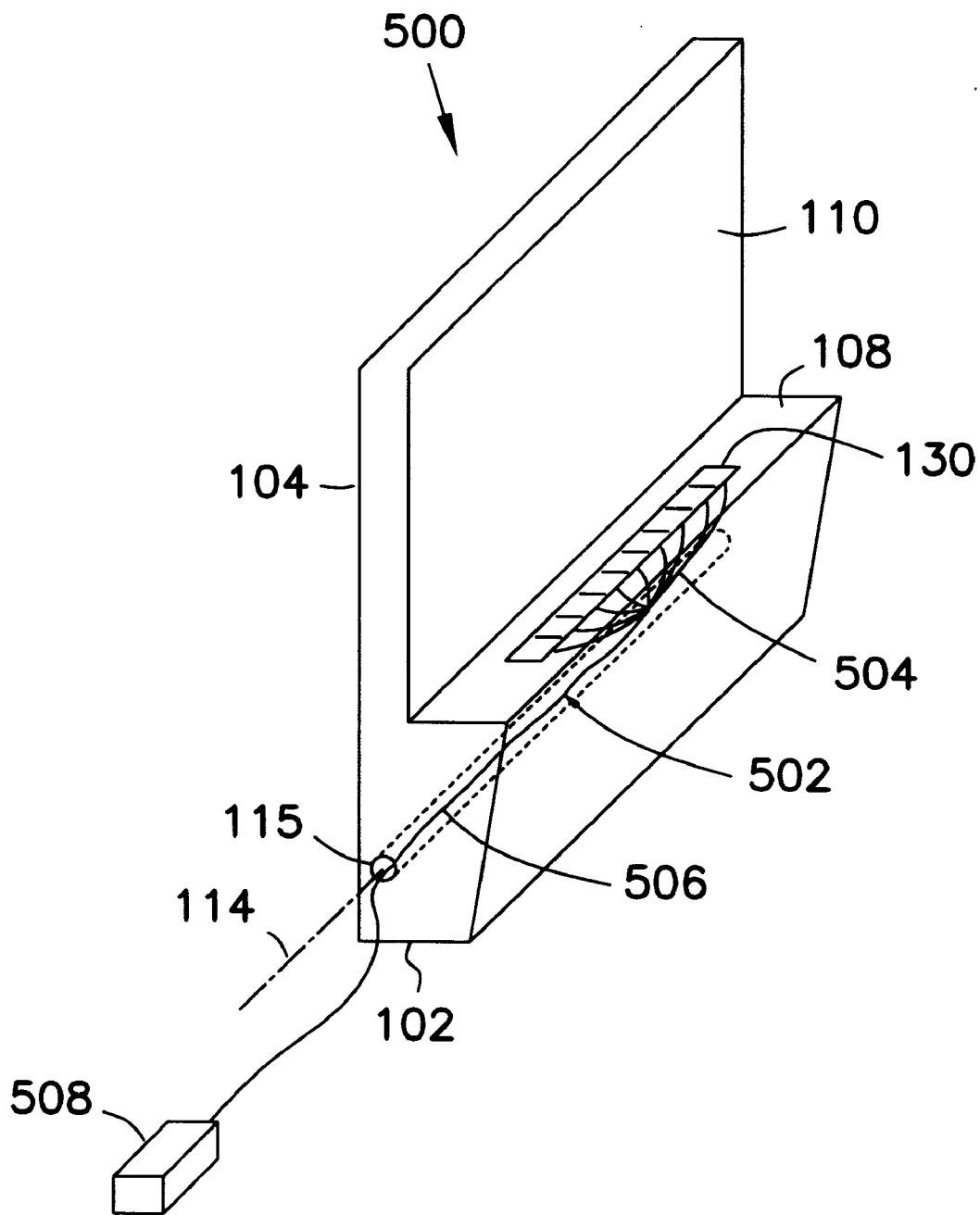
FIG. 5C is a perspective view of another docking cradle embodiment of the present invention.

In another alternate embodiment 500 shown in FIG. 5C, a signal cable 502 is operatively connected to connection port 130 by connectors 504. Connectors 504 are bundled into cable 506, which is run through the axis 114 opening 115 into the body of the computer. Cable 506 ends in a connector 508 suitable for connection with the internal connector for the cable.

When a PDA is placed in the cradle 100, the communication port on a PDA is connected with communication port 130 on the docking cradle 100. Further, the angle of the support 106 including cradle base 108 and cradle back 110 allow for a PDA to be retained in the cradle 100 by gravity. In other words, when a PDA is connected to the cradle 100 when the cradle 100 is in the operational position shown in FIG. 2, the PDA is tilted so that it rests in the support 106, and is not only connected to the cradle 100, but is also retained therein by the force of gravity. An embodiment of a PDA 142 connected to the docking cradle 100 is shown in phantom in FIG. 2.

A host device such as host device 112 may include any number of devices, such as a personal desktop computer, a laptop computer, or a portable computer. Further, the connection of a docking cradle such as docking cradle 100 is not limited to a computer. Instead, the docking cradle may be mounted to a peripheral device, such as a keyboard, printer, or the like. Even further, a docking cradle such as docking cradle 100 may also be mounted to non-traditional host devices, such as a piece of furniture or the like.

Figure 6:
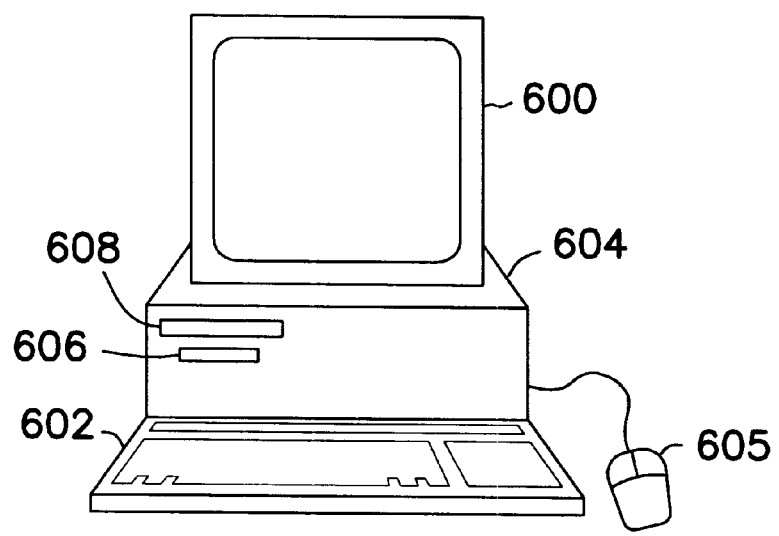
FIG. 6 is a perspective view of a desktop computer on which embodiments of the present invention may be utilized.
Figure 7:
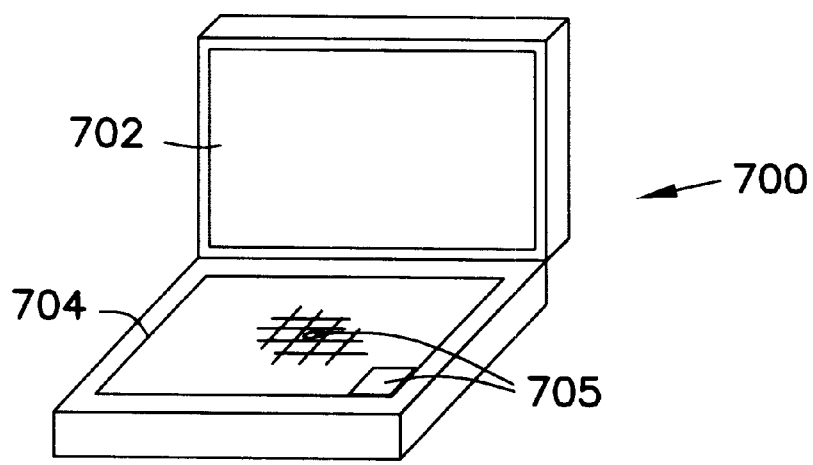
FIG. 7 is a perspective view of a portable or laptop computer on which embodiments of the present invention may be utilized.

Desktop computers, as shown in FIG. 6, typically include a monitor 600, keyboard input 602, central processing unit 604, and a pointing or selection device such as mouse 605. Further components of a typical computer system may include a machine readable storage media such as disk drive 606, hard disk, CD-ROM 608, DVD, modem, and the like. The processor unit of such a computer typically includes a microprocessor, memory (RAM and ROM), and other peripheral circuitry, not shown. Portable or laptop computers, as shown in FIG. 7 include the same features in general as desktop computers, but are smaller, and often comprise a single unit 700 with integrated display screen 702, keyboard 704, and pointing device 706 such as a touch pad or trackball. Such computers are some of the types of host devices on which embodiments of the present invention may be employed.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A docking cradle for an electronic device, comprising:
a cradle having a device connector port, the cradle movable between a first closed position, and a second operational position in which the device connector is available for use, and wherein the device connector port is hidden from normal view when the cradle is in the second operational position.

2. The docking cradle of claim 1, wherein the second operational position is at an angle in which the cradle will retain a device by gravity retention.

3. The docking cradle of claim 1, wherein the cradle is in a host device having a housing.

4. The docking cradle of claim 1, wherein the cradle movement is rotational.

5. The docking cradle of claim 2, wherein the second operational position angle is less than 90 degrees from a horizontal plane.

6. The docking cradle of claim 3, wherein the cradle further comprises:
a bottom face and a back face, the bottom face and the back face substantially perpendicular to one another, so as to be substantially flush to the housing of the host device when the docking cradle is in the first closed position; and
a support comprising a cradle base and a cradle back substantially perpendicular with one another, the support concealed within the housing when the cradle is in the first closed position, and the support capable of holding a device when the cradle is in the second operational position.

7. The docking cradle of claim 6, and further comprising:
a device connecting cable running through the cradle base to a first corner, and into the housing in a substantially proximal location to the first corner when the cradle is in the second operational position.

8. The docking cradle of claim 6, wherein the cradle back is at an acute angle with respect to the top of the housing, the cradle back forming a device support when the cradle is in the second operational position.

9. The docking cradle of claim 7, wherein the device connecting cable is a flat ribbon cable.

10. An integrated docking cradle for a personal digital assistant (PDA), comprising:
a docking cradle having a PDA connector port, the docking cradle moveable between a first closed position and a second operational position.

11. The docking cradle of claim 10, wherein the docking cradle motion is rotation.

12. The docking cradle of claim 10, wherein the docking cradle is connected to a housing by a pivot pin.

13. The docking cradle of claim 12, wherein the pivot pin is hollow, and a cable connector runs through the hollow pivot pin to the housing.

14. A computer system, comprising:
a computer having a housing; and
a docking cradle for an electronic device, the docking cradle substantially flush with the housing when in a first closed position and not in use, and movable into a second cradling position when in use.

15. The computer system of claim 14, wherein the cradle movement is rotational.

16. The computer system of claim 14, wherein the second cradling position is at an angle in which the docking cradle will retain a PDA by gravity retention.

17. The computer system of claim 14, wherein the back face rests against the housing when the docking cradle is in the second cradling position.

18. The computer system of claim 16, wherein the second cradling position angle is less than 90 degrees from a horizontal plane.

19. A computer, comprising:
a central processing unit contained within a housing;
a display screen; and
a keyboard;
wherein the housing has a docking cradle integrated therein, the docking cradle movable between a first closed position in which the PDA connector port is hidden from normal view, and a second operational position in which the PDA connector is available for use.

20. The computer of claim 19, wherein the second operational position is at an angle in which the docking cradle will retain a PDA by gravity retention.

21. The computer of claim 19, wherein the docking cradle further comprises an external contour visible when the docking cradle is in the first closed position, the external contour substantially flush with the housing.

22. The computer of claim 19, wherein the docking cradle further comprises:

a bottom face and a back face, the bottom face and the back face substantially perpendicular to one another, so as to be substantially flush with the housing when in the first storage position;

a PDA support comprising a cradle base and a cradle back substantially perpendicular with one another, the PDA support concealed within the housing when the docking cradle is in the first storage position, and the PDA support capable of holding a PDA when the docking cradle is in the second cradling position.

23. The computer of claim 20, wherein the second operational position angle is less than 90 degrees from a horizontal plane.

24. The computer of claim 22, and further comprising:

a PDA connecting cable running through the docking cradle base to a first corner, and into the housing in a substantially proximal location to the first corner when the docking cradle is in the second cradling position.

25. The computer of claim 22, wherein the docking cradle base has an access opening, and further comprising:

a PDA connecting cable running through the docking cradle base through the access opening in the cradle base, and into the housing.

26. The computer of claim 25, wherein the access opening is a pivot pin access opening.

27. The computer of claim 25, wherein the connecting cable runs through a hollow pivot pin in the access opening.

28. A hideaway docking cradle for an electronic device, comprising:

a docking cradle having a device connector port, the docking cradle having a means for configuring between a first closed position in which the device connector port is hidden from normal view, and a second operational position in which the device connector port is available for use.

29. The hideaway docking cradle of claim 28, wherein the means for configuring comprises rotating the docking cradle between one of the first position and the second position, and the other of the first position and the second position.

* * * * *